United States Patent [19]

Maggert

[11] Patent Number: 5,516,274
[45] Date of Patent: May 14, 1996

[54] STRETCH BLOW MOLDING MACHINE WITH MOVABLE BLOW MOLD ASSEMBLY

[75] Inventor: Lynn R. Maggert, Arcanum, Ohio

[73] Assignee: Electra Form, Inc., Vandalia, Ohio

[21] Appl. No.: 310,970

[22] Filed: Sep. 23, 1994

[51] Int. Cl.$^6$ ........................................ B29C 49/30
[52] U.S. Cl. .................... 425/526; 264/535; 264/538; 425/529; 425/534
[58] Field of Search ........................... 425/526, 529, 425/534, 574; 264/535, 538, 542

[56] References Cited

U.S. PATENT DOCUMENTS

| | | | |
|---|---|---|---|
| 4,382,760 | 5/1983 | Wiatt et al. | 425/526 |
| 4,472,127 | 9/1984 | Cyriax et al. | 425/183 |
| 4,500,274 | 2/1985 | Cyriax et al. | 425/185 |
| 4,702,685 | 10/1987 | Fruntzek | 425/182 |
| 4,805,285 | 2/1989 | Reyes | 425/186 |
| 4,810,182 | 3/1989 | Groll | 425/190 |
| 5,096,404 | 3/1992 | Janos et al. | 425/190 |

*Primary Examiner*—Tim Heitbrink
*Attorney, Agent, or Firm*—Locke Reynolds

[57] ABSTRACT

A blow molding machine configured to receive plastic parisons and output blow mold formed containers has a support frame having a trackway. A parison conveyor is attached to the support frame, and a blow mold assembly is positionable in its operating position within the support frame to receive parisons from the parison conveyor. A track mounted frame is movably supported by the trackway, with the track mounted frame configured to support the blow mold assembly as the blow mold assembly is moved outward from its operating position within the support frame to its service position adjacent to the support frame, with outward movement of the blow mold assembly permitting improved access for servicing.

10 Claims, 8 Drawing Sheets

STRETCH BLOW MOLDING MACHINE WITH MOVABLE BLOW MOLD ASSEMBLY

BACKGROUND OF THE INVENTION

The present invention relates to a stretch blow molding machine for producing plastic containers from parisons. More particularly, the present invention relates to a blow mold assembly movably mounted with respect to a blow molding machine to allow for convenient maintenance and servicing.

Blow molding machines for producing plastic containers from heated parisons are widely employed. Conventional blow molding machines commonly include a mechanism for transporting parisons from a heating unit to a blow mold composed of paired halves that can alternately be separated or brought together in sealed engagement. The mold halves include an interior wall configured to the shape of the container to be formed within the blow mold. A parison heated to the appropriate blow molding temperature is transported between the separated paired halves of the mold, which are then brought together to define a mold cavity holding the parison. The parison is then expanded by high pressure gas, with the expanding parison wall eventually contacting walls of the blow mold. The parison is cooled by that contact with the mold wall and is thereby dimensionally stabilized at the desired container configuration. The paired halves of the mold are then separated, and the newly formed container or bottle is ejected or otherwise transported from the mold, ready for further processing. Because this process is highly automated and generally requires only minimal operator supervision, blow molding machines can be compactly built to fit into small building facilities.

However, when maintenance, service, or replacement of the blow mold is required, a compact configuration of a blow molding machine is disadvantageous. For example, replacement of a mold due to wear or to accommodate desired variations in container configuration or size can require extensive disassembly of the blow molding machine to access the blow mold. Such time consuming repairs or modifications can seriously slow factory operations which require a continuous supply of formed containers. What is needed is a blow molding machine which readily provides access to the blow mold and to the auxiliary equipment controlling operation of the blow mold. To speed and simplify maintenance, access to a blow mold assembly should not require any significant disassembly of the blow molding machine.

SUMMARY OF THE INVENTION

A blow molding machine of the present invention is configured to include a support frame having a parison conveyor attached to the support frame for conveying parisons through the machine. A trackway for supporting a blow mold assembly is also coupled to the support frame. The parison conveyor is positioned in a horizontal plane other than that occupied by the trackway supporting the blow mold assembly, The parison conveyor being either above or below the trackway depending on the preform orientation. The blow mold assembly is placed in its operating position within the support frame to receive parisons from the parison conveyor to process them using conventional blow molding techniques to form a blow molded container. Uniquely, the present invention provides a track mounted frame movably supported by the trackway, with the track mounted frame configured to support the blow mold assembly as the blow mold assembly is moved outward from its operating position within the support frame to its service position adjacent to the support frame. This outward movement of the track carried blow mold assembly permits improved access for servicing, maintenance, or replacement.

In preferred embodiments, the track carried blow mold assembly includes paired halves of a blow mold, with each half respectively coupled to a clamp arm of a clamp arm assembly for pressing together the halves of the blow mold. The clamp arm assembly is also supported by the track mounted frame, which in addition carries a hydraulic piston assembly configured to drive the clamp arm assembly to press together the halves of the blow mold. Like the blow mold assembly, service of the clamp arm assembly and hydraulic piston assembly is improved by the ease of access provided by track mounting of the respective assemblies.

The blow molding machine of the present invention has several additional features, including a stretch rod assembly fixedly attached to the support frame above the blow mold assembly, and a heater assembly for heating parisons, the heater assembly being positioned adjacent to the parison conveyor assembly. In certain embodiments, the blow mold assembly includes a dual blow mold for simultaneously forming a pair of bottles, with each blow mold comprising paired halves respectively coupled to a clamp arm of a clamp arm assembly for pressing together the halves of the blow mold. In principal, the blow mold assembly can comprise any number of blow mold pairs operating to simultaneously form any number of bottles or containers.

Additional features, and advantages of the present invention will be apparent upon consideration of the following detailed description and accompanying drawings showing the best mode of the invention as presently perceived.

DETAILED DESCRIPTION OF PREFERRED EMBODIMENTS

Figure 1:
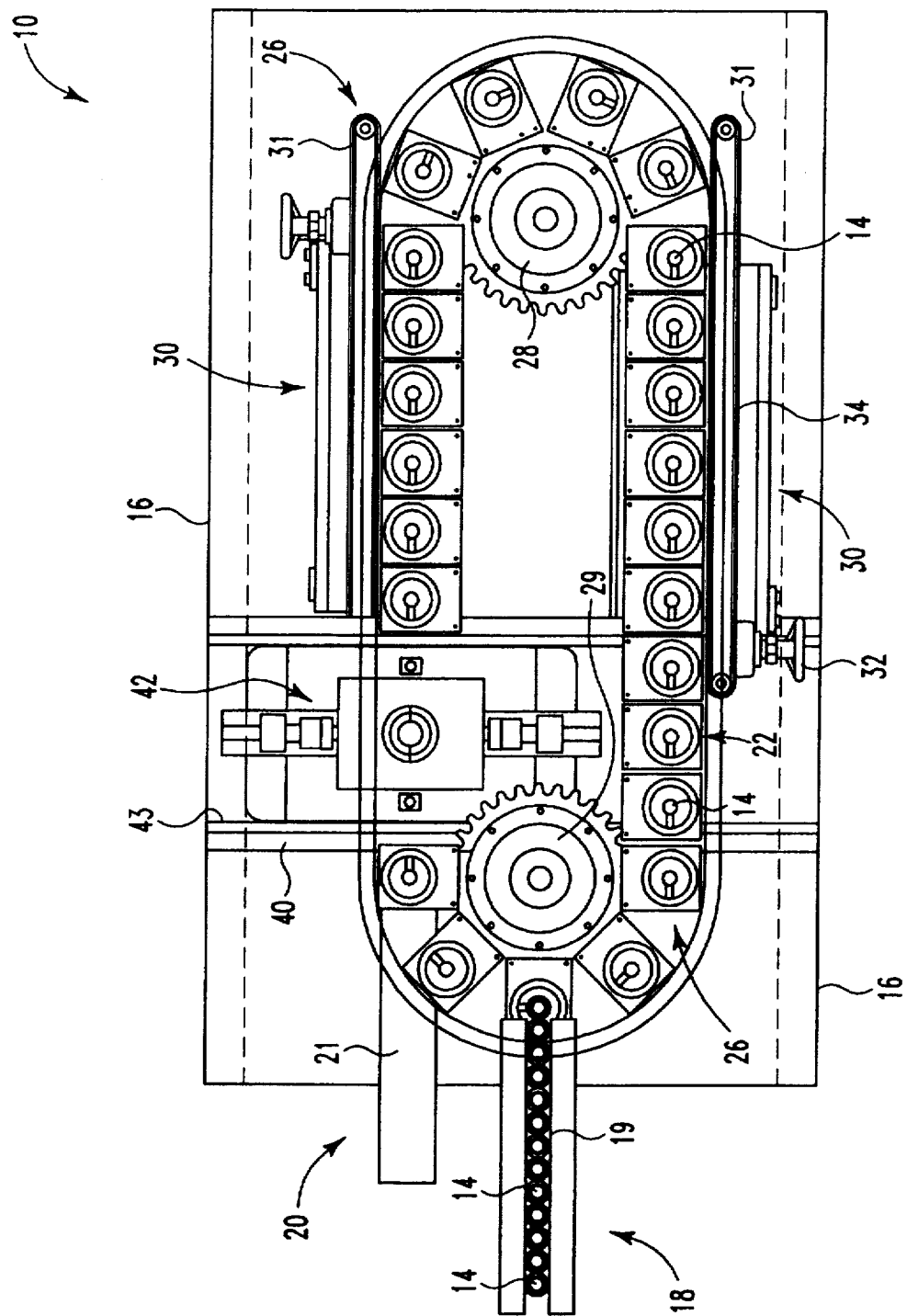
FIG. 1 is a top plan view of a first embodiment of a stretch blow molding machine according to the present invention, showing a parison conveyor system for transporting parisons past a heating assembly to a track mounted blow mold assembly having a blow mold supported therein.
Figure 2:
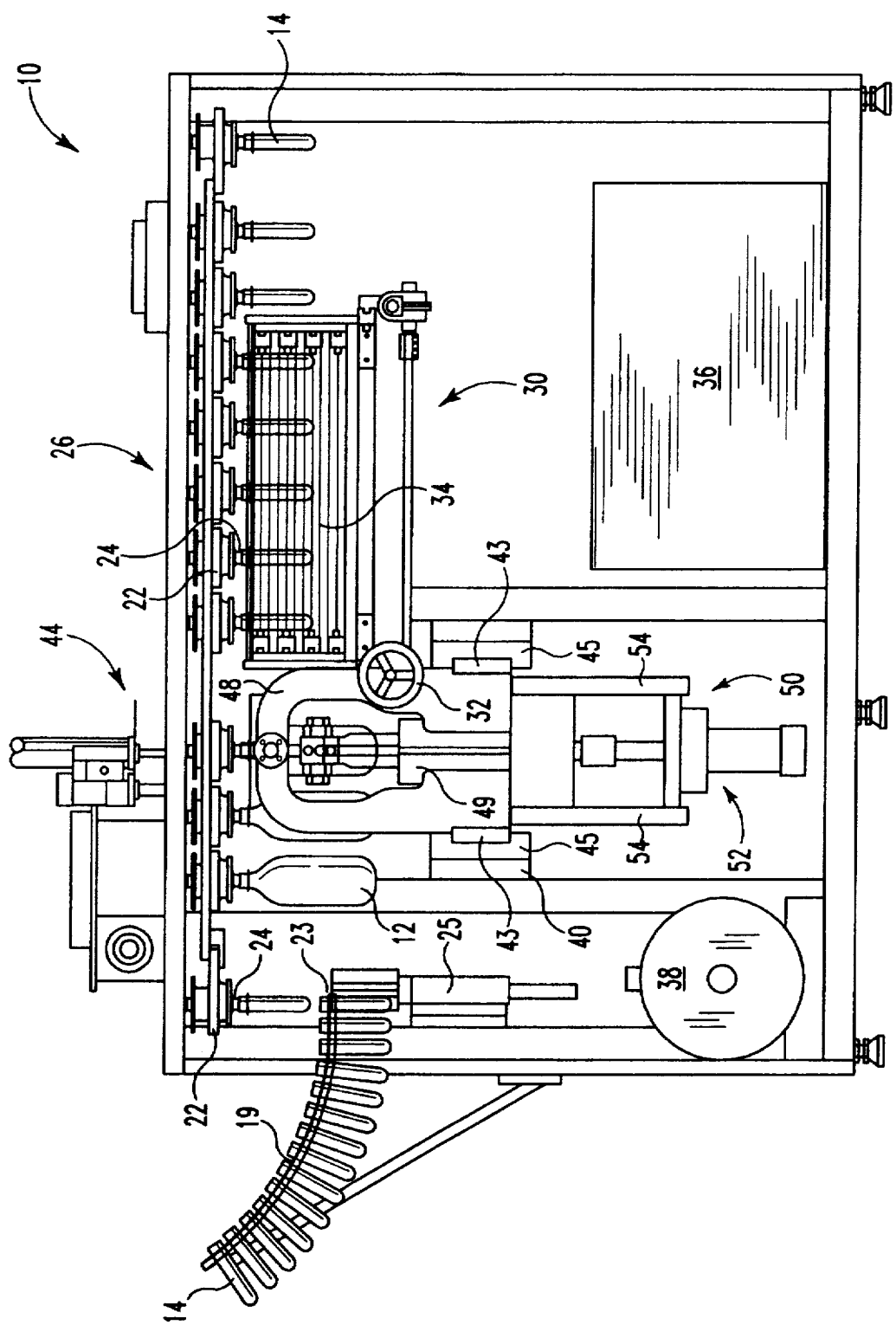
FIG. 2 is a side elevation view of the blow molding machine of FIG. 1, illustrating heater elements of the heating assembly and the track mounted blow mold assembly, including hydraulically driven clamp arms for pressing together paired halves of the blow mold.
Figure 3:
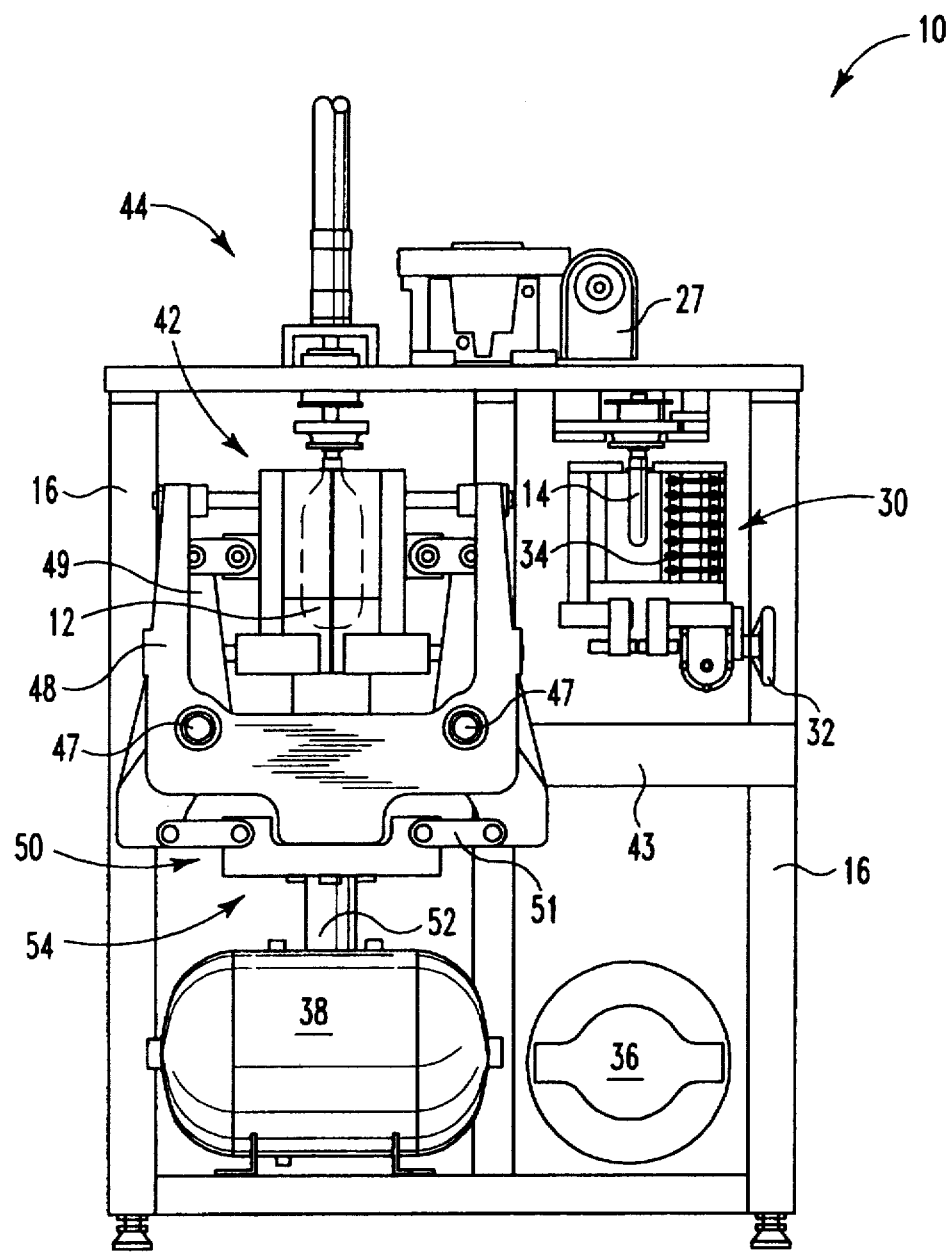
FIG. 3 is a front elevation view of the blow molding machine of FIGS. 1 and 2, illustrating positioning of a stretch rod assembly above the blow mold assembly, and the blow mold assembly aligned with the parison conveyor.

As illustrated in FIGS. 1, 2, and 3, a stretch blow molding machine 10 for blow molding plastic parisons 14 into containers 12 includes a generally rectangular metal support frame 16. An input line assembly 18 for accepting parisons 14 and a output line assembly 20 for conveying away the containers 12 from the blow molding machine 10 are both attached to the support frame 16. As illustrated, the input line assembly 18 includes a track 19 along which the parisons drop toward the support frame 16 of the blow molding machine 10, while the output line assembly 20 includes a chute 21 connected to the support frame 16. As those skilled in the art will appreciate, alternative delivery and export mechanisms are feasible, with dual or single trackways, chutes, movable arms or sweeps, pneumatic delivery or export systems, or other conventional mechanisms for moving parisons and containers being possible alternatives to the illustrated systems.

Each parison 14 delivered to the blow molding machine 10 is separately engaged to a support head 24 and associated parison support plate 22 of a parison conveyor assembly 26. The engagement is achieved by cylinder 23 driving parison carrier 25 at the input end of track 19 upward until the open end of the parison 14 engages the support head 24. A plurality of parison support plates and support heads are driven in a continuous path around the periphery of the metal support frame 16 by an electrically operated stepping gear drive 27 acting through a first and second revolving gear assembly 28 and 29. This continuous path is best illustrated in FIG. 1, which shows an oval conveyor having the gear assemblies 28 and 29 mounted at opposite ends. Both the input line assembly 18 and output line assembly 20 are mounted adjacent to each other near the second gear assembly 29.

As the parisons 14 move around the oval conveyor, the support heads revolve the parisons when engaged by drive chains 31. This revolution assists in even distribution of radiative heat from the two dual heater assemblies 30. Each dual heater assembly 30 includes heating elements 34 positioned parallel to the parison transport path on the linear portion or long dimension of the oval conveyor. The heating elements 34 can be positioned at an exact determined distance from the parisons 14 by use of spacing adjustment wheel 32. As the rotating parisons 14 move past the heating elements 34, they are heated to a desired temperature, typically near the glass transition temperature $T_g$, to achieve the required softening the parison wall and expansion characteristics desired for blow molding the parisons 14. As those skilled in the art will appreciate, modification of heater temperature, spacing, or modification of residence time of the parison in the dual heater assembly 30 can be collectively or individually controlled for best results.

After each parison 14 is heated to the required temperature, it individually enters a blow mold assembly 42. The blow mold assembly 42, best illustrated in FIGS. 3 and 5, includes paired halves 46 of a blow mold, with opening and closure of the paired halves 46 controlled by a pair of clamp arms 49 pivotally mounted for angular displacement about pivot point 47 in blow mold clamp support assembly 48. The clamp arms 49 are moved through toggle links 51 by a hydraulic piston assembly 50, which includes a hydraulic piston 52 supported by a hydraulic system frame 54. The hydraulic system frame 54 and the blow mold clamp support assembly 48 are connected to slide frames 43 which are supported in slide trackways 45 fixed to the rectangular frame 16.

A hydraulic oil tank 36, mounted to the support frame 16, has lines connected to the hydraulic piston 52. Downward movement of the piston 52 causes clamp arms 49 of the clamp support assembly 48 to spread apart, separating the halves 46 of the blow mold. A heated parison 14 enters the blow mold, which is then closed by reversal of the movement of the hydraulic piston 52 and the clamp support assembly 48. A stretch rod impelled downward into the parison from a stretch rod assembly 44 mounted to the rectangular support frame 16 above the blow mold assembly 42 stretches the parison 14 as high pressure air from pressurized air source 38 is introduced into the parison 14. The parison 14 quickly expands, contacts the much cooler mold wall, and solidifies into the formed container. The stretch rod is quickly removed from the container and the hydraulic piston assembly 50 is again engaged to drive apart the paired halves 46 of the blow mold assembly 42. The blow molded container is transported by the conveyor assembly 26 out of the blow mold, where it is quickly output onto the chute 21 of the output line assembly 20. The process is then repeated with the next parison on the parison conveyor 26.

Figure 4:
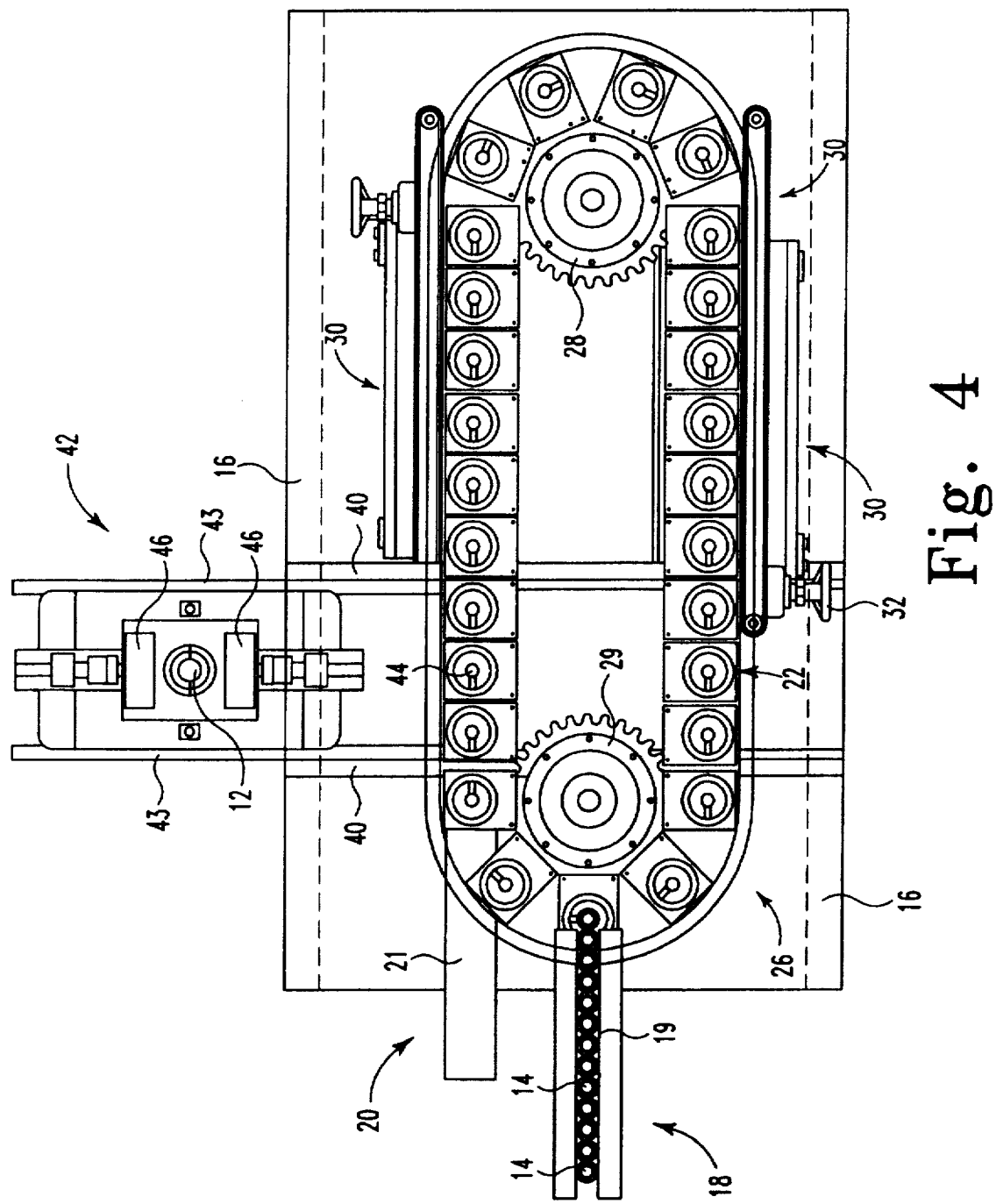
FIGS. 4 and 5 are views of the blow molding machine respectively corresponding to FIGS. 1 and 3, illustrating the blow mold assembly pulled outward and away from the support frame of the blow molding machine to allow for easy maintenance and servicing of the blow mold assembly.
Figure 5:
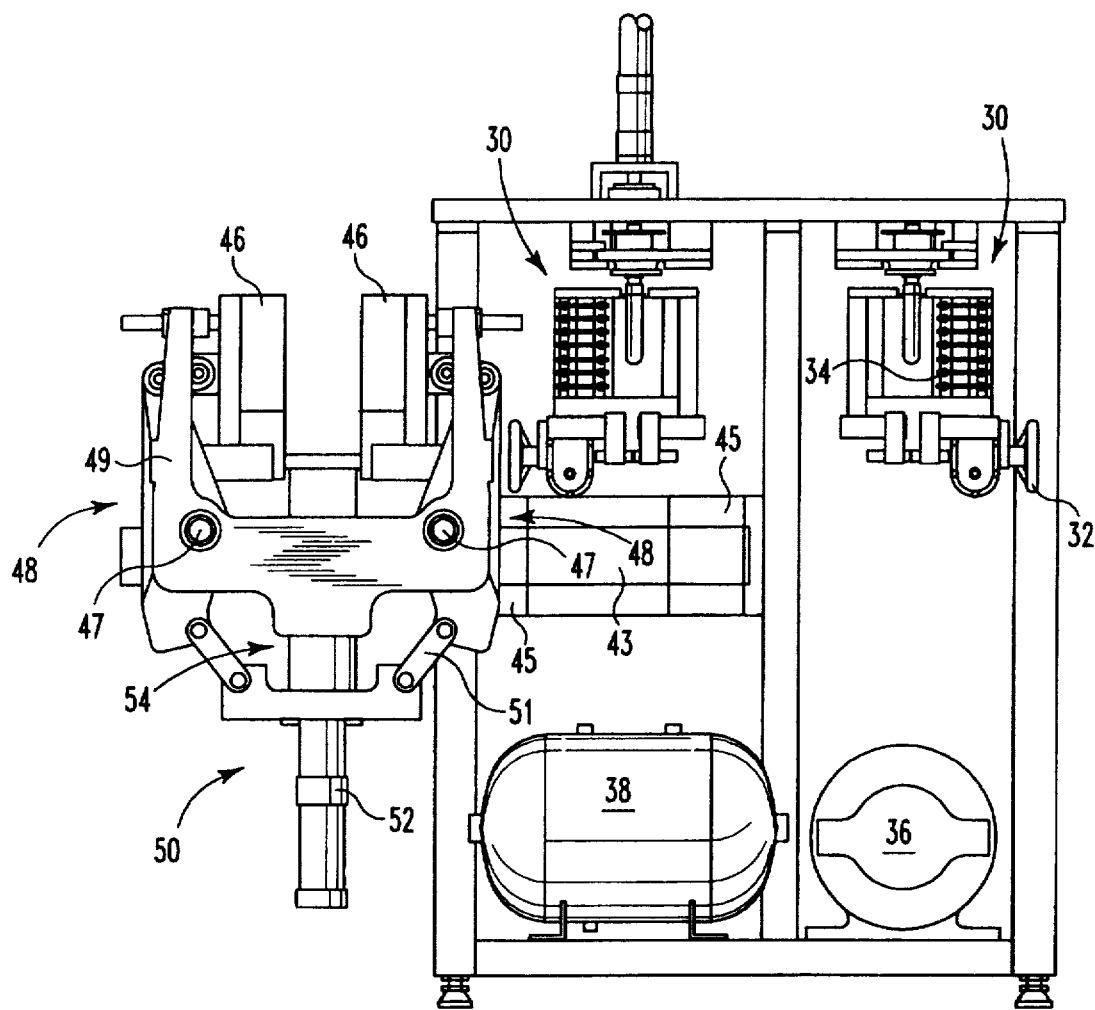

As shown most clearly by comparing FIGS. 3 and 5, the blow mold assembly 42 of the present invention, supported by the slide frames 43, is mounted for longitudinal movement in slide trackways 45 mounted on frame members 40. The frame members 40 are integrally attached elements of the support frame 16, and support the slide trackways 45 that permit the longitudinal outward movement of the blow mold assembly when required for maintenance and servicing. This outward, longitudinal movement is best illustrated in FIGS. 4 and 5, which show the blow mold assembly 42, including its integrally attached hydraulic piston assembly 50, pulled out from the support frame 16 for easy access to the various components, particularly mold halves 46.

Figure 6:
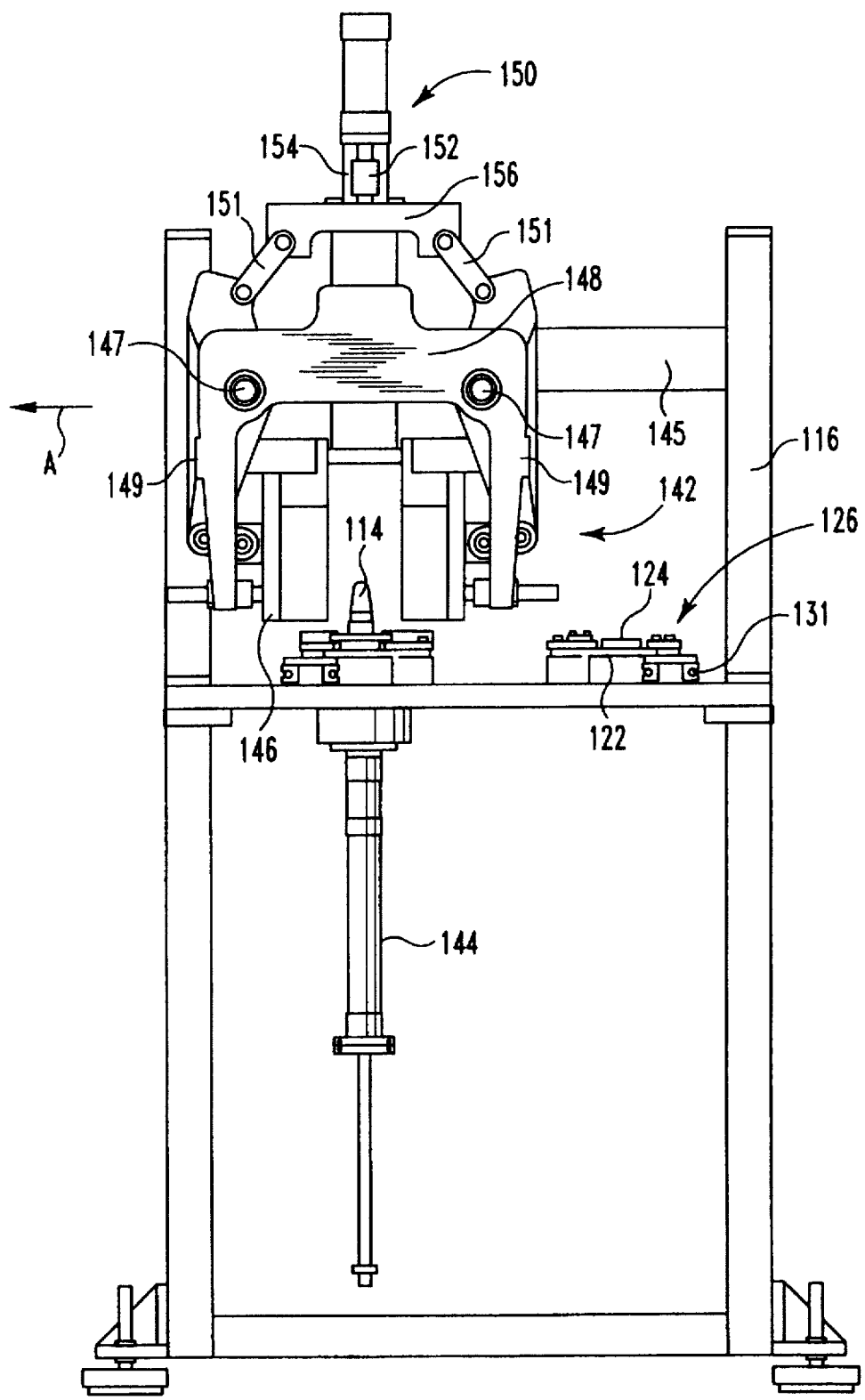
FIG. 6 is a front elevation view similar to FIG. 3 of a second embodiment of a stretch blow molding machine according to the present invention for use with inverted parisons.
Figure 7:
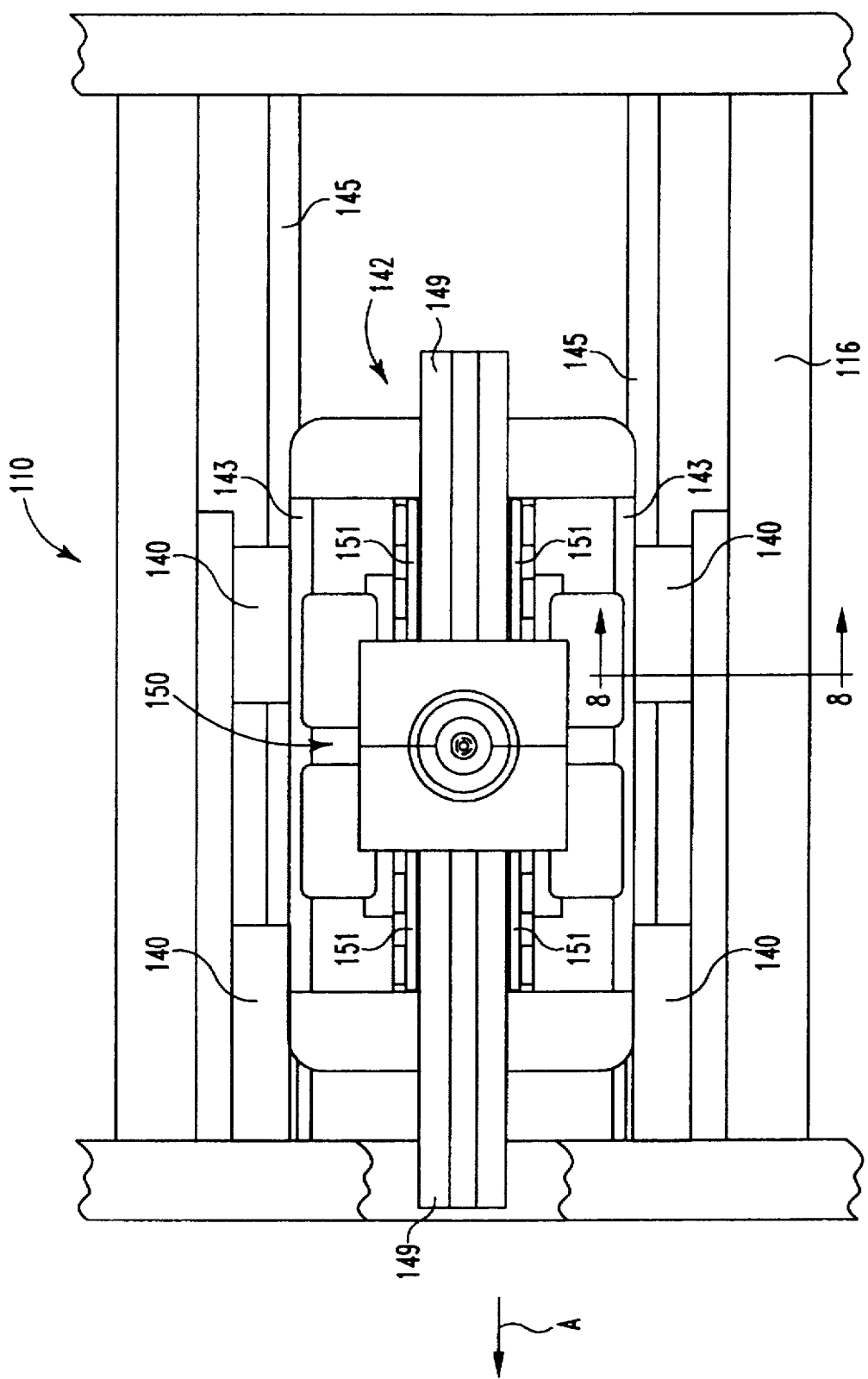
FIG. 7 is a top plan view of the portion of the stretch blow molding machine shown in FIG. 6 containing the trackway supporting the blow mold assembly.

As illustrated in FIGS. 6 and 7, a stretch blow molding machine 110 for blow molding plastic parisons into containers includes a generally rectangular metal support frame 116. Each parison delivered to the blow molding machine 110 is in an inverted orientation from that shown in FIGS. 1–5, and is separately engaged to a support head 124 and associated parison support plate 122 of a parison conveyor assembly 126. A plurality of parison support plates 122 and support heads 124 are driven in a continuous path around the periphery of the metal support frame 116 by an electrically operated stepping gear drive in a manner similar to that disclosed in connection with the first embodiment.

As the parisons move around the conveyor assembly 126, the support heads 124 revolve the parisons when engaged by drive chains 131. This revolution assists in even distribution of radiative heat from the heater assemblies (not shown). As the rotating parisons move past the heater assemblies, they are heated to a desired temperature, typically near the glass transition temperature $T_g$, to achieve the required softening of the parison wall and expansion characteristics desired for blow molding the parisons. The inverted orientation reduces the heating effect on the finish portion of the parisons.

After each parison is heated to the required temperature, it individually enters a blow mold assembly 142. The blow mold assembly 142 includes paired halves 146 of a blow mold, with opening and closing of the paired halves 146 controlled by a pair of clamp arms 149 pivotally mounted for angular displacement about pivot point 147 in blow mold clamp support assembly 148. The clamp arms 149 are moved through toggle links 151 by a hydraulic piston assembly 150 supported by a hydraulic system frame 154. The hydraulic piston assembly 150 includes a hydraulic piston having a rod coupled to yoke 156 by a rod alignment coupler 152. Downward movement of the piston and rod alignment coupler 152 and yoke 156 causes clamp arms 149 of the clamp support assembly 148 to pivot thus closing the halves 146 of the blow mold around a heated parison 114.

A stretch rod is then impelled upward into the parison 114 from a stretch rod assembly 144 mounted to the rectangular support frame 116 below the blow mold assembly 142 which stretches the parison 114 as high pressure air from a pressurized air source (not shown) is introduced into the parison 114. The parison 114 quickly expands, contacts the much cooler mold wall, and solidifies into the formed container. The stretch rod is quickly removed from the container and the hydraulic piston assembly 150 is again engaged to drive apart the paired halves 146 of the blow mold assembly 142. The blow molded container is transported by the conveyor assembly out of the blow mold. The process is then repeated with the next parison on the parison conveyor 126.

Figure 8:
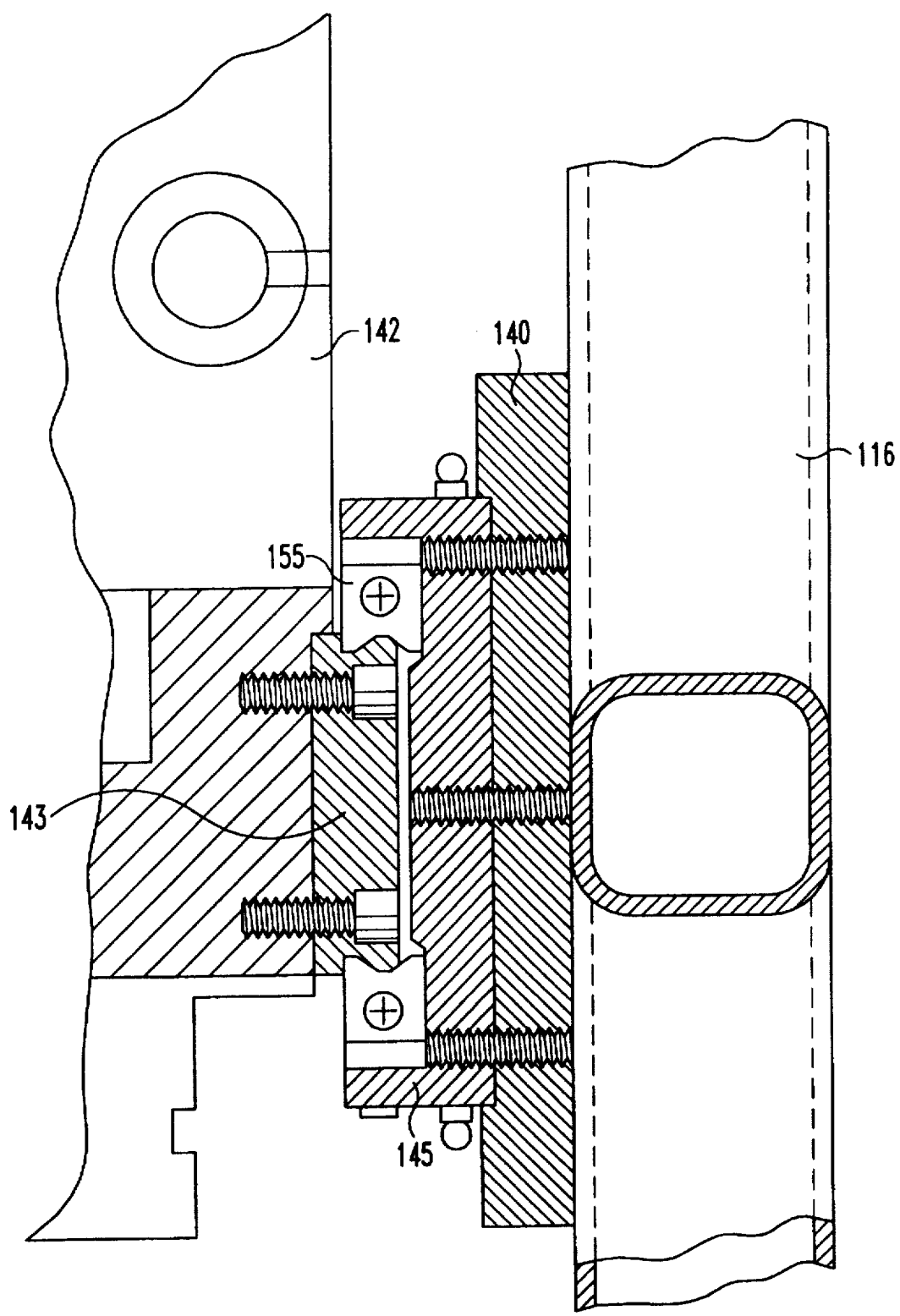
FIG. 8 is a sectional view taken along line 8—8 of FIG. 7 showing the details of the trackway supporting the blow mold assembly.

As shown in FIGS. 7 and 8, the hydraulic system frame 154 and the blow mold clamp support assembly 148 are connected to slide frames 143 which are supported in slide trackways 145 fixed to the rectangular frame 116 and include bearing units 155. The slide frames 143 are mounted for longitudinal movement in slide trackways 145 mounted on frame members 140. The frame members 140 are integrally attached elements of the support frame 116, and support the slide trackways 145 that permit the longitudinal outward movement of the blow mold assembly 142, in the direction of arrow A shown in FIGS. 6 and 7, when required for maintenance and servicing. This outward, longitudinal movement is similar to that illustrated in FIGS. 4 and 5, which show the blow mold assembly 42, including its integrally attached hydraulic piston assembly 50, pulled out from the support frame 16 for easy access to the various components, particularly mold halves 46.

As those skilled in the art will appreciate, alternative mounting schemes are contemplated to be within the scope of the present invention. In particular, the mold assemblies can be mounted in either an upright or inverted position relative to the frame depending on the desired orientation of the parisons. In addition to sliding trackways such as THK linear motion rails, it is possible to utilize ball bearing slides, telescoping slides, pivoting arms or other conventional mechanisms for supporting such machinery for outward movement beyond the confines of the rectangular frames 16 and 116.

While the present invention has been described in connection with specific embodiments, it will be apparent to those skilled in the art that various changes may be made therein without departing from the spirit or scope of the invention.

I claim:

1. A blow molding machine configured to receive plastic parisons and output blow molded containers, the blow molding machine comprising a support frame having a trackway, a parison conveyor attached to the support frame, a blow mold assembly positionable at an operating position within the support frame to receive parisons from the parison conveyor, and a track mounted frame movably supported by the trackway, the track mounted frame configured to support the blow mold assembly as the blow mold assembly is moved outward from an operating position within the support frame to a service position adjacent to the support framed with outward movement of the blow mold assembly permitting access for servicing of the blow mold assembly outside the support frame.

2. The blow molding machine of claim 1, wherein the blow mold assembly comprises a clamp arm assembly mounted for movement with the track mounted frame, and a pair of mold halves of a blow mold defining at least one container-forming cavity, each mold half respectively coupled to a clamp arm of a clamp arm assembly for pressing together the halves of the blow mold.

3. The blow molding machine of claim 2, wherein the blow mold assembly further comprises a hydraulic piston assembly mounted for movement with the track mounted frame and configured to drive the clamp arm assembly to press together the halves of the blow mold.

4. The blow molding machine of claim 1, further comprising a stretch rod assembly fixedly attached to the support frame at said operating position of the blow mold assembly within the support frame.

5. The blow molding machine of claim 1, further comprising a heater assembly for heating parisons, the heater assembly being positioned adjacent to the parison conveyor assembly, the parison conveyor assembly being positioned above the blow mold assembly.

6. A blow molding machine configured to receive plastic parisons and output blow molded containers, the blow molding machine comprising a support frame having a trackway, a parison conveyor attached to the support frame, the parison conveyor having a plurality of parison supports and a drive mechanism for driving the plurality of parison supports in a circuit, with each parison support capable of supporting a parison, heating elements attached to the support frame adjacent to the circuit for heating parisons attached to the parison supports, a blow mold assembly including blow mold halves positionable in an operating position within the support frame so that the blow mold halves are situated on opposite sides of said circuit to receive parisons from the parison conveyor, a stretch rod assembly attached to the support frame adjacent to the blow mold assembly operating position including a stretch rod insertable into each parison to stretch the parisons when located in the blow mold, and a track mounted frame movably supported by the trackway, the track mounted frame configured to support the blow mold assembly for permitting the blow mold assembly to be moved outward from an operating position within the support frame to a service position adjacent to the support frame, with outward movement of the blow mold assembly permitting access for servicing of the blow mold assembly outside the support frame.

7. The blow molding machine of claim 6, wherein the blow mold assembly comprises a clamp arm assembly mounted for movement with the track mounted frame including a clamp support assembly and at least a pair of clamp arms pivotally coupled to the clamp support assembly, said blow mold halves defining at least one container-forming cavity, each mold half respectively coupled to a clamp arm of a clamp arm assembly for pressing together the halves of the blow mold.

8. The blow molding machine of claim 7, wherein the blow mold assembly further comprises a hydraulic piston assembly mounted for movement with the track mounted frame, a yoke and toggle links coupling the hydraulic piston assembly to said clamp arms and configured to drive the clamp arms to press together the halves of the blow mold.

9. A blow molding machine configured to receive plastic parisons and output blow molded containers, the blow molding machine comprising a support frame having a trackway, a blow mold assembly positionable in an operating position within the support frame to receive parisons, and a track mounted frame movably supported by the trackway, the track mounted frame configured to support the blow mold assembly as the blow mold assembly is moved from a first position within the support frame to a second position adjacent to and wholly outside the frame.

10. The blow molding machine of claim 9, wherein the blow mold assembly comprises a clamp arm assembly mounted for movement with the track mounted frame including a clamp support assembly, a pair of blow mold halves and at least a pair of clamp arms pivotally coupled to the clamp support assembly, said blow mold halves defining at least one container-forming cavity, each mold half respectively coupled to one of the clamp arms, a hydraulic piston assembly mounted for movement with the track mounted frame, and a yoke and toggle links coupling the hydraulic piston assembly to said clamp arms to drive the clamp arms to press together the halves of the blow mold.

* * * * *

REEXAMINATION CERTIFICATE (3161st)

United States Patent [19]

Maggert

[11] B1 5,516,274

[45] Certificate Issued Mar. 18, 1997

[54] STRETCH BLOW MOLDING MACHINE WITH MOVABLE BLOW MOLD ASSEMBLY

[75] Inventor: Lynn R. Maggert, Arcanum, Ohio

[73] Assignee: Electra Form, Inc., Vandalia, Ohio

Reexamination Request:
No. 90/004,321, Aug. 2, 1996

Reexamination Certificate for:
Patent No.: 5,516,274
Issued: May 14, 1996
Appl. No.: 310,970
Filed: Sep. 23, 1994

[51] Int. Cl.⁶ ................................ B29C 45/77
[52] U.S. Cl. .................. 425/526; 264/535; 264/538; 425/529; 425/534

[56] References Cited

FOREIGN PATENT DOCUMENTS

| | | |
|---|---|---|
| 0538516A1 | 4/1993 | European Pat. Off. . |
| 0635352A2 | 1/1995 | European Pat. Off. . |
| 1229004 | 9/1960 | France . |
| 1498659 | 9/1966 | France . |
| 1565593 | 3/1969 | France . |
| 1267531 | 3/1972 | United Kingdom . |

*Primary Examiner*—Tim Heitbrink

[57] ABSTRACT

A blow molding machine configured to receive plastic parisons and output blow mold formed containers has a support frame having a trackway. A parison conveyor is attached to the support frame, and a blow mold assembly is positionable in its operating position within the support frame to receive parisons from the parison conveyor. A track mounted frame is movably supported by the trackway, with the track mounted frame configured to support the blow mold assembly as the blow mold assembly is moved outward from its operating position within the support frame to its service position adjacent to the support frame, with outward movement of the blow mold assembly permitting improved access for servicing.

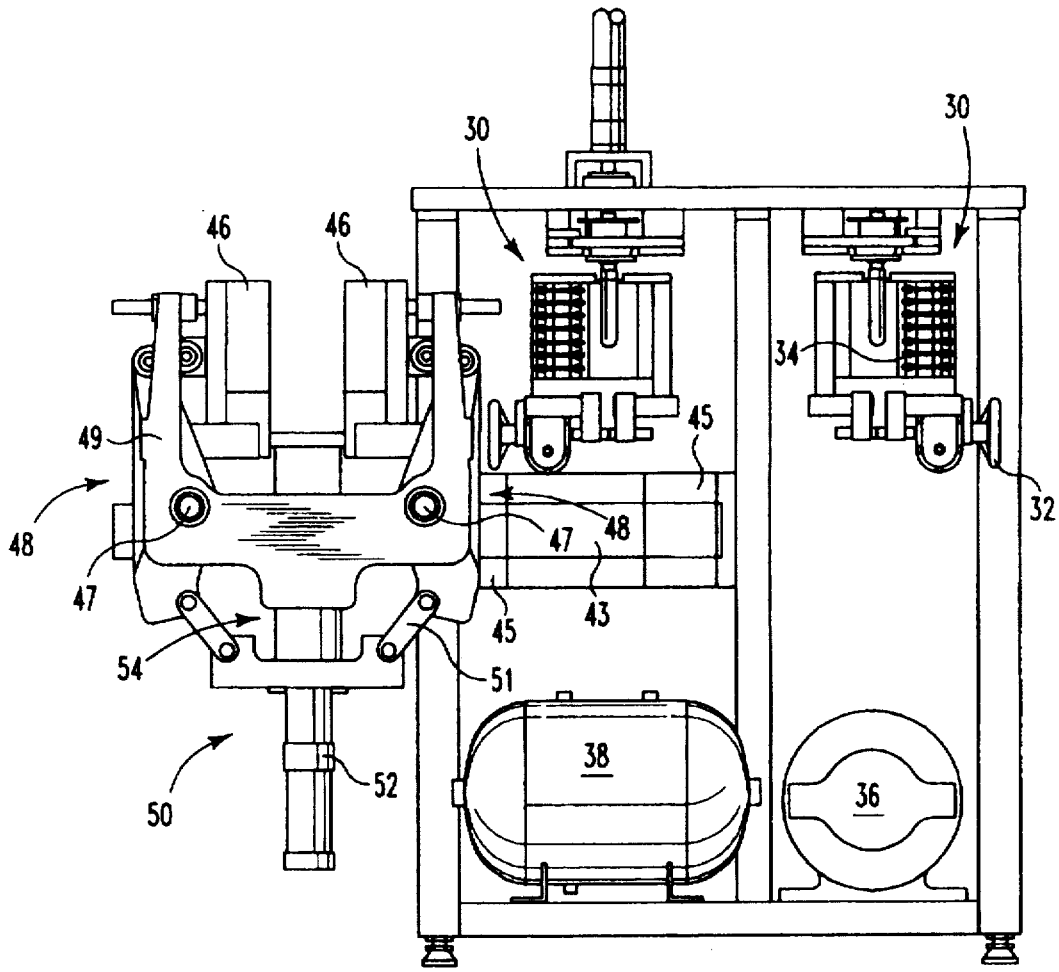

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 and 10 is confirmed.

* * * * *